Dec. 9, 1930.   B. GOLDMAN   1,784,428
HYDRAULIC JACK
Filed April 8, 1929   3 Sheets-Sheet 1
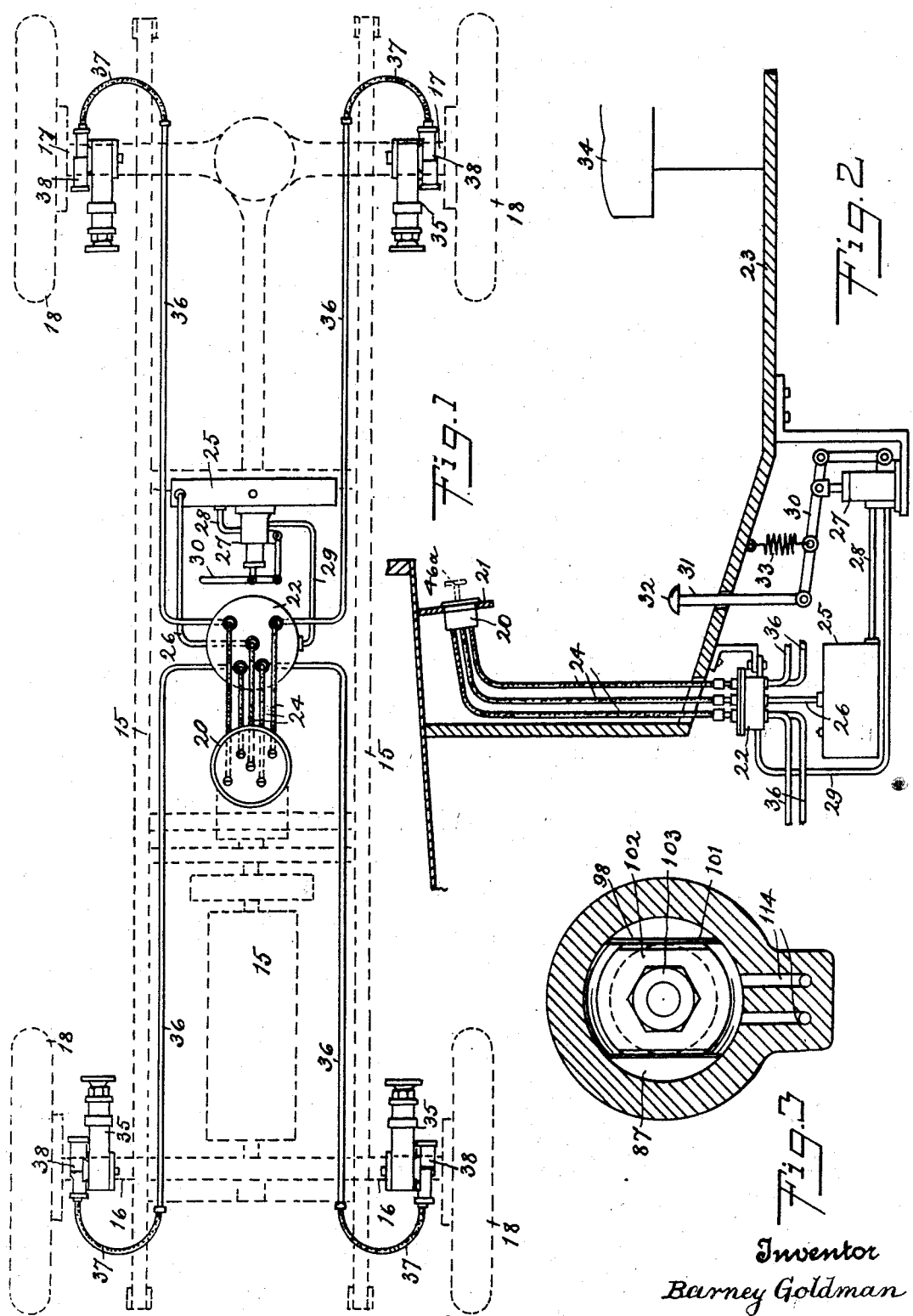
Inventor
Barney Goldman
By his Attorney
Joshua Bergstrom

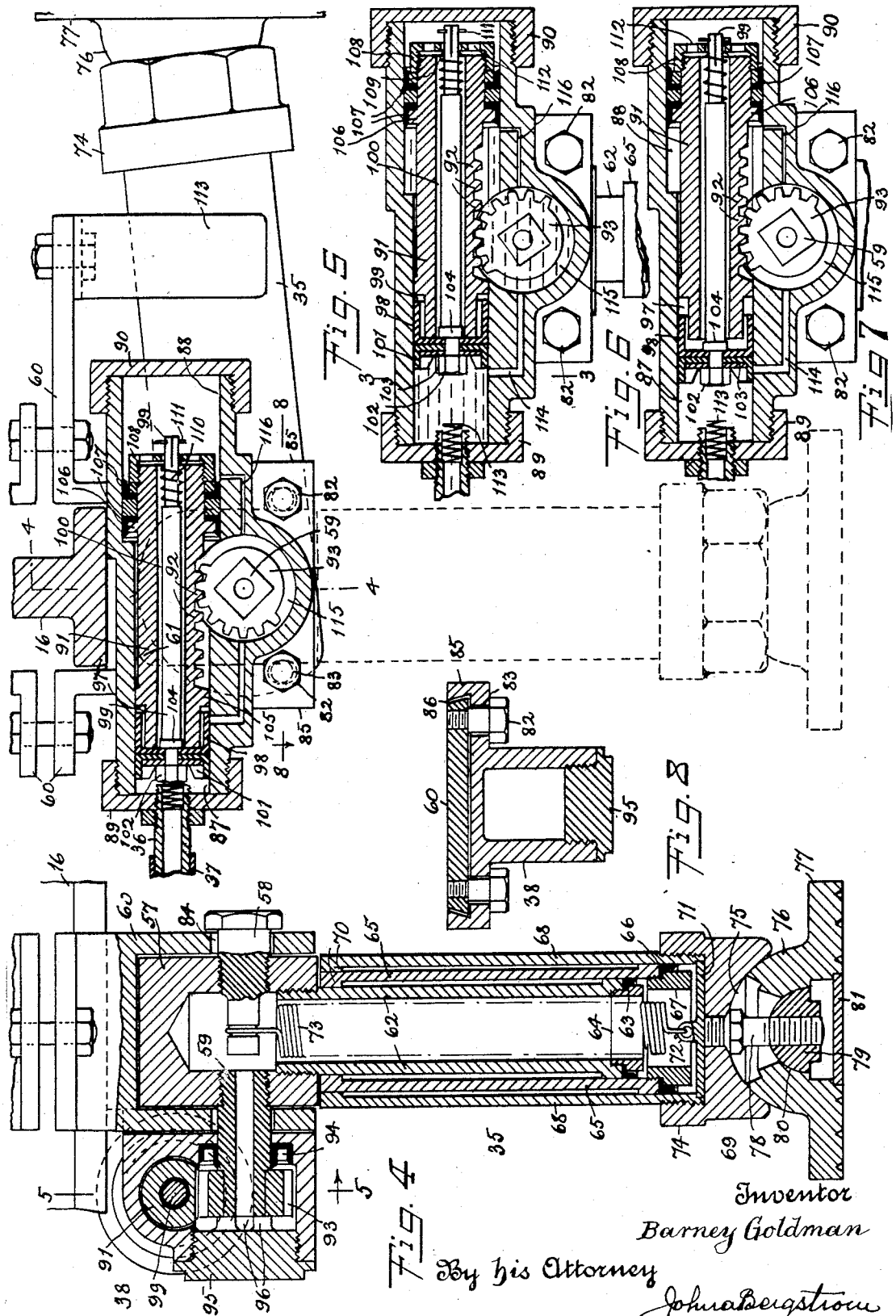

Dec. 9, 1930.  B. GOLDMAN  1,784,428
HYDRAULIC JACK
Filed April 8, 1929  3 Sheets-Sheet 3

Inventor
Barney Goldman
By his Attorney
John A. Bergstrom

Patented Dec. 9, 1930

1,784,428

UNITED STATES PATENT OFFICE

BARNEY GOLDMAN, OF NEW YORK, N. Y.

HYDRAULIC JACK

Application filed April 8, 1929. Serial No. 353,390.

This invention relates to new and useful improvements in hydraulic lifting jacks and comprises a device of this kind which is adapted to be permanently secured to a vehicle, and having a part adapted to be forced therefrom by fluid under pressure and comprises devices controlled and within reach of the operator, while seated behind the steering wheel of the car, whereby any or all the jacks may be moved into an operative position and then expanded by liquid under pressure, for the purpose of lifting any selected wheel or the entire body of the car from the ground.

An object of the invention is to provide a suitable hydraulic pump operated either manually or by means of connection with the engine of the automobile, and controlled within the reach of the operator when seated behind the steering wheel, for the purpose of forcing a liquid, stored in a tank, into any one of the selected jacks.

Another object of the invention is to provide jacks which are subject to operation in one direction by hydraulic power, and in the reverse direction when the hydraulic power is relieved, by the weight of the vehicle and to a further extent by a suitable valve mechanism which forces the jacks to normally fold up horizontally under the car while traveling on the road.

Another object of the invention is to provide a selecting device within reach of the operator, whereby any one or all the jacks may be connected by flexible means to a distributing device under the floor or foot board, thereby preventing any oil leakage in the interior of the car.

Another object of the invention is to provide a simple locking or anti-rattling device for the jacks while in an inoperative position when the car is travelling on the road.

And still another object of the invention is to provide means whereby the pressure of the liquid will first move the jack from a locked horizontal into a vertical or operative position and then expand same and at the end of the operation will move the contracted jack back into a horizontal position into a locking device.

With these and other objects in view, the invention consists in the details of construction and arrangement of parts to be hereinafter more fully described, claimed and illustrated in the accompanying drawings in which similar numerals of reference designate corresponding parts throughout the several views in which:—

Fig. 1 represents a plan view of an automobile, shown in dotted lines, with the invention shown diagrammatically in full lines.

Fig. 2 is a longitudinal section of a portion of an automobile, showing the location of the several parts of the invention diagrammatically.

Fig. 3 is a cross-section on line 3—3 of Fig. 6.

Fig. 4 is a vertical cross-section on line 4—4 of Fig. 5 showing the jack ready to be expanded.

Fig. 5 is a vertical section on line 5—5 of Fig. 4 showing the jack in an inoperative or locked position.

Fig. 6 is a vertical section on line 5—5 of Fig. 4 showing the valve and the jack in an expanded or operative position.

Fig. 7 is a similar section of the valve and jack, ready to be moved back into its locked position.

Fig. 8 is a horizontal section on line 8—8 of Fig. 5.

Figure 9:
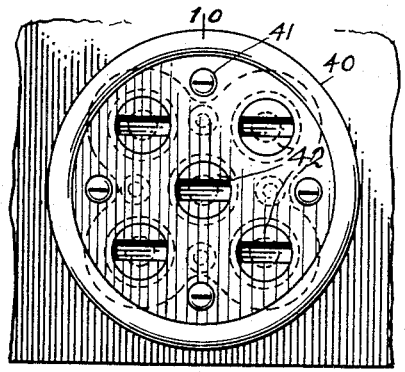
Fig. 9 is a face view of the selecting device on the instrument board.

In the drawings the numeral 15 designates the chassis of an automobile shown in dotted lines in Fig. 1, having front and rear axles 16—17 provided with wheels 18—19. The selecting device 20 is mounted on the instrument board 21 in reach of the operator. The distributing device 22 is mounted underneath the floor 23 of the car and is connected to the selecting device 20 with flexible shafts 24. The storage tank 25 is mounted underneath the floor 23 and is connected to the distributing device 22 by a pipe 26. The pump 27 is also mounted underneath the floor 23 and is connected to the tank 25 by a suction pipe 28 and to the distributing device 22 by a discharge pipe 29. To the pump lever 30 is attached an upright rod 31, passing through the floor of the car, having at its apex a knob 32. Interposed between the floor 23 and the pump-lever 30 is a spring 33 for the purpose of returning said lever to its normal position as shown in Fig. 2. When the upright rod 31 is depressed by the operator's foot, while seated on the seat 34 the liquid is forced into the distributor and at the end of the stroke, the spring 33 will restore the pump-handle 30 to its normal position. The jack 35 is mounted underneath the axles 16—17 and is connected to the distributing device 22 by pipes 36 having at its outer ends a flexible tube 37 which connects with the controlling valve 38 of the jack 35.

Figure 10:
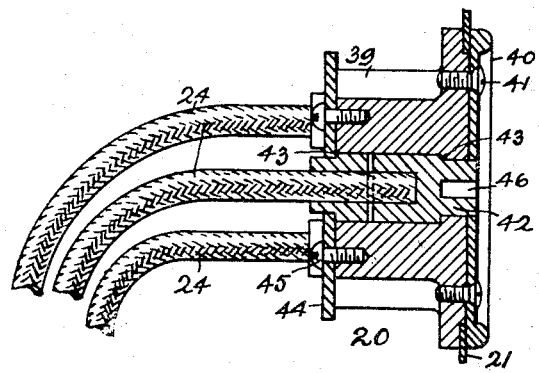
Fig. 10 is a vertical cross-section on line 10—10 of Fig. 9.

By referring to Figs. 9—10 it will be seen that the selecting device 20 consists of a housing 39 fastened to the instrument board 21 by a ring 40 and screws 41. In this housing are mounted to rotate small rollers 42 having shoulders 43 on each end of same and are held in place by a plate 44 fastened to the back of same by screws 45. The front end of these rollers are flush with the ring 40 and has a slot 46 for the reception of a small key 46a shown in dotted lines of Fig. 2, for the purpose of rotating same. The back end of said roller projects somewhat through the ring 44. To the centre of the roller 42 at the rear end thereof is fastened a flexible shaft 24. The other end thereof connects with the distributing device 22.

Figure 11:
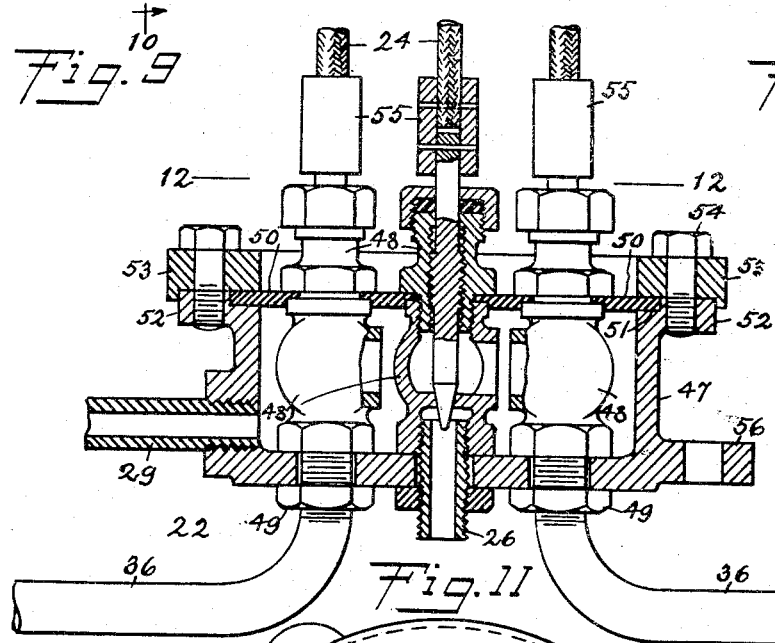
Fig. 11 is a vertical cross-section of the manifold on line 11—11 of Fig. 12.
Figure 12:
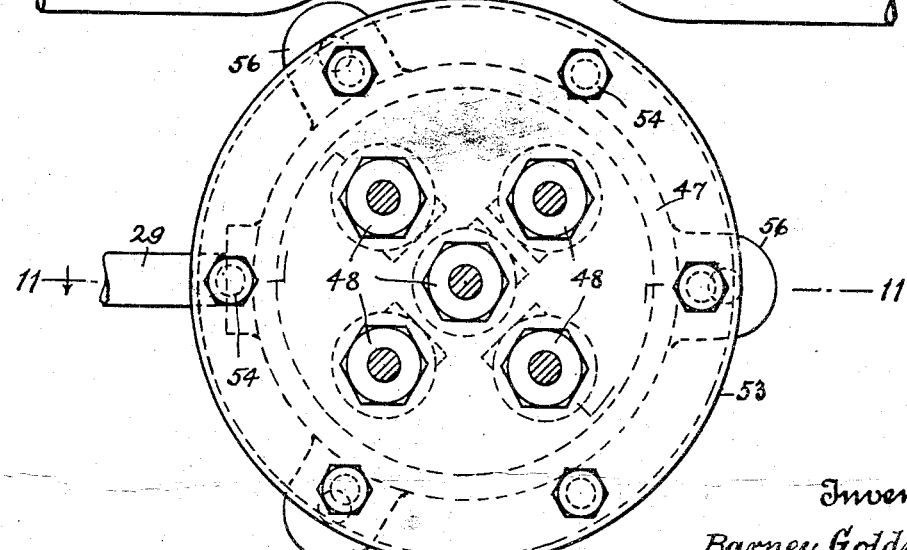
Fig. 12 is a horizontal section on line 12—12 of Fig. 11.

By referring to Figs. 11—12, it will be seen that the distributing device 22 consists of a hollow cylindrical housing 47 into which, at the bottom thereof, are fastened five needle valves 48 of the angular type, by locknuts 49. The upper portions of these valves are fastened to a plate 50 which fits into a recess 51 formed in the flange 52 of the housing 47. A ring 53, fastened to said flange by screws 54 forms a tight joint of the device. To the upper ends or stems of the valves are attached sleeves 55 which connect same to the flexible shafts 24. To the lower ends of the four outside valves connects a pipe 36 which in turn connects with the jacks 35. The lower end of the centrally located valve connects with the tank 25 through pipe 26. A pipe 29 is screwed into the lower portion of the cylindrical casing which connects same to the discharge pipe from the pump. At the outside lower portion of the casing 47 are extending lugs 56 for the purpose of attaching same to the bottom of the floor 23 of the car.

By referring to Figs. 4—5, it will be seen that the jack 35 comprises a head 57 swingingly mounted on trunnions 58—59 in the clamp 60 which is fastened to the axle 16. The head 57 has a projection 61 which forms a stop against the clamp, so that the jack can only swing downward to a vertical position. Into the head 57 is screwed a tubular member 62 which at its lower end has a packing 63 held in position by a nut 64. The tubular member 62 is surmounted by another tubular member 65 which also has at its lower end a packing 66, held in position by a nut 67. This tubular member fits into another tubular member 68. The lower end thereof is screwed into a base 69. The tubular member 65 has at its upper and lower ends flanges 70, which coact with similar flanges on sections 62—68, and act as guides and also to limit the movements of said tubular members when the jack is expanded. Into the lower portion of the tubular member 68 fits a plate 71 to which is fastened a small eye 72. Interposed between this eye and trunnion 58 is a spring 73 for the purpose of contracting the jack after being expanded.

The upper portion 74 of the base 69 has at its lower end a spherical cavity 75 into which fits the convex spherical portion 76 of the plate 77. A stud 78 is screwed into the centre of 74 and extends downward into the spherical portion, said stud having a spherical nut 79 which coacts with another spherical cavity 80 of the plate 77. The opening at the bottom is closed by a plate 81. It will now be seen that this construction constitutes a universal joint, so that when the end of the jack strikes uneven ground, the base 69 will adjust itself thereto.

The control valve 38 is made flat on the back side where it fits up against the clamp 60 and is fastened to the jack 35 by means of the hollow trunnion 59 and is mounted to slide vertically on the beveled sides of the clamp 60, and held in position by bolts 82 passing through vertically elongated slots 83. The trunnions 58—59 pass through vertically elongated slots 84 of the clamp 60. The valve 38 has laterally overlapping portions 85 which fit over the beveled sides 86 of the clamp 60. The object of this construction is to relieve the trunnions from any pressure, so that when the jack is placed in an operative position it will be free to move up until the head 57 comes in contact with the under side of the clamp 60.

The valve 38 has two different sized bores 87—88 and is closed at each end by caps 89—90. Into the bores 87—88 fits a tubular piston 91 provided with a packing at each end, the object thereof to be described later. The middle lower portion of said piston has teeth 92 meshing with a pinion 93 which is fastened to the square end of the hollow trunnion 59. Back of the gear wheel 93 is a packing 94 which prevents leakage around the trunnion. In front of the pinion 93 is a cap 95 which has small channels 96 so that the oil can pass from the valve into the hollow trunnion 59, thence into the jack 35. This arrangement is clearly shown in Fig. 4.

At the left hand end of the tubular piston 91, see Figs. 5—6—7, is an annular recess 97 for the reception of a packing 98, fastened to the end of the valve stem 99 which passes through the centre bore 100 of the piston 91. Another packing ring 101 facing in the opposite direction is also fastened to the valve stem by a nut 102 and a follower 103 against a shoulder 104 on the valve stem 99. Adjacent to the recess 97 is an annular collar 105 which is ground to a tight fit into the bore 97. At the opposite end of the piston 91 is an annular collar 106. This forms a stop for the packings 107 which are held in position by a nut 108 having a square hole 109 in its centre, through which the square end of the valve stem 99 passes. The object of this is to keep the valve stem from turning. Interposed between said nut and a shoulder on the valve stem is a spring 110 and at the outer end of the square end is a small cotter pin 111 which limits the forward movement of the stem. The nut 108 has holes 112 through which the oil passes into the large end of the valve.

By referring to Fig. 3, it will be seen that the packing 98—101 is cut off at the sides or in other words, they only contact with the cylinder at the top and bottom leaving a space at each side thereof. The object of this construction is, that when the pressure of the oil presses the piston 91 towards the right, a tight joint is maintained between the packing and the end of the piston, but when the pressure is released the spring 110 will press the packing forward, thereby closing the ports 114 and when pressure is again applied, the oil will pass by the packing and into the large end of the valve.

Ports 114 are drilled into the body of the valve just in front of the packing 101 when the jack is in a vertical position shown in dotted lines of Fig. 5, and terminate into a chamber 115 into which the gear wheel 93 is located. At the opposite side of said chamber is a small vent 116 which connects with the large end of the cylinder 88. The object of this is, that after the jack is restored to a position shown in full lines of Fig. 5, the pressure will be equalized and the oil will drain back into the jack.

When the jack is in an inoperative position as shown in Fig. 5, it is held and kept from rattling by a spring 117 which straddles the jack and is fastened to an extended portion of clamp 60.

Into the end of the pipe 37 where it enters the valve is fastened a small spring 113 for the purpose of closing the valve stem 99 against the end of the piston 91. It will be understood that when the piston travels towards the left this valve is kept open by the tension of the spring 110 and at the end of the stroke comes in contact with the spring 113, which closes the valve stem tight against the end of the piston.

The operation is as follows: All valves are normally closed and when the operator selects a designated jack, the valve with its pipe line leading thereto is opened by a small key from the selecting device, the jack is held in a normal position by the spring clamp. The pump is now operated and the oil under pressure enters the control valve. The pressure now moves the piston towards the right, thereby releasing the jack from the clamp and turning it down into a vertical position, shown in dotted lines of Fig. 5. The piston has now reached a position shown in Fig. 6 and uncovered the inlet port 114. The fluid now passes through this port into the gear chamber and thence through the hollow trunnion thereby expanding the jack and consequently lifting part of the car from the ground. It will be seen that the pressure is also against one side of the packing in the large end of the cylinder which has a tendency to hold the jack in an upright position. When it is desired to let the car down, after the repairs have been made, the centre valve in the distributing device is opened and the oil will flow in a reverse direction into the storage tank, by reason of the weight of the car on jack, and then the spring 73 will contract the jack and when the pressure against the packing is exhausted, the spring back of the valve stem will force same toward the left, thereby covering up the inlet port.

If the relief valve is now closed and liquid again under pressure is introduced into the cylinder, the liquid will now pass around the packing at the end of the valve stem and through the hollow piston into the large end of the control valve, thereby forcing the piston back to its normal position shown in full lines of Fig. 5.

As the piston moves toward the left, at the end of its stroke, the end of the valve stem comes in contact with the small spring in the inlet pipe, thereby pushing the same back until the packing comes in contact with the end of the piston, by this time the jack is held in its locked position by the anti-rattling spring. The valve is now closed and the jack remains in this position.

I claim:—

1. In a hydraulic jack the combination with a head adapted to fasten to an object, of telescopic tubular plungers swingingly mounted on the head, a fluid inlet leading into the head, a port in the head at predetermined times communicating with the plungers, a tubular piston slidingly arranged in the head adapted to swing the plungers downward and upward, a valve having a stem slidably arranged in the piston, said valve including means controlled by the position of the piston to cover or uncover the port by the actuation of the valve.

2. In a hydraulic jack the combination with a head adapted to fasten to an object, of telescopic tubular plungers swingingly mounted on the head, a fluid inlet leading into the head, a port in the head at predetermined times communicating with the plungers, a tubular piston slidingly arranged in the head adapted to swing the plungers downward and upward, a valve having a stem slidably arranged in the piston, said valve including means controlled by the position of the piston to cover or uncover the port by independent actuation of the valve governed by the movement of the piston.

3. In a hydraulic jack the combination with a head adapted to fasten to an object, of telescopic tubular plungers swingingly mounted on the head, a fluid inlet leading into the head, a port in the head at predetermined times communicating with the plungers, a tubular piston slidingly arranged in the head adapted to swing the plungers downward and upward, a valve having a stem slidably arranged in the piston, said valve including means controlled by the position of the piston to open or close the port by independently actuating the valve which is governed by the movement of the piston, the said valve being designed to open or close the bore of the tubular piston.

4. In a hydraulic jack the combination with a head adapted to fasten to an object, of telescopic tubular plungers swingingly mounted on the head, a fluid inlet leading into the head, a port in the head at predetermined times communicating with the plungers, a tubular piston slidingly arranged in the head adapted to swing the plungers downward and upward, a valve having a stem slidably arranged in the piston, said valve including means controlled by the position of the piston to open or close the port by independently actuating the valve which is governed by the movement of the piston, the said valve being designed to open or close the bore of the tubular piston, and a vent leading from the head into the plungers to relieve the pressure of the fluid from the rear end of the piston.

Signed at New York, in the county of New York and State of New York this 4th day of April, A. D. 1929.

BARNEY GOLDMAN.